(No Model.)
T. WHERRITT.
Fire Escape.
No. 234,828.          Patented Nov. 23, 1880.
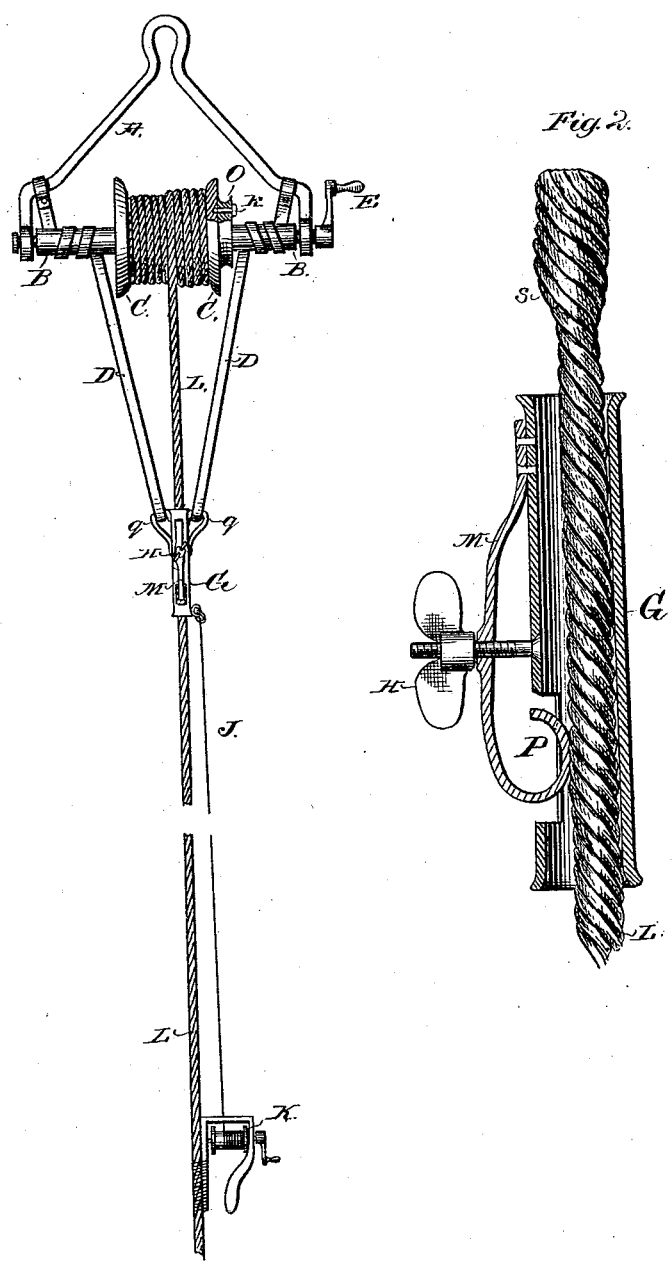
WITNESSES:
INVENTOR:
Thos Wherritt
BY
ATTORNEYS.

UNITED STATES PATENT OFFICE.

THOMAS WHERRITT, OF CYNTHIANA, KENTUCKY.

FIRE-ESCAPE.

SPECIFICATION forming part of Letters Patent No. 234,828, dated November 23, 1880.

Application filed May 25, 1880. (No model.)

*To all whom it may concern:*

Be it known that I, THOMAS WHERRITT, of Cynthiana, in the county of Harrison and State of Kentucky, have invented a new and Improved Fire-Escape; and I do hereby declare that the following is a full, clear, and exact description of the same, reference being had to the accompanying drawings, forming part of this specification, in which—

Figure 1 is a side view of the whole apparatus. Fig. 2 is an enlarged detail of the friction-sleeve.

My invention relates to a novel construction of fire-escape; and it consists in a swinging frame carrying a windlass having reel-heads, a rope wound between the reel-heads and of a length sufficient to reach to the ground, a set of friction-straps fastened to the swinging frame and wrapped once or twice around the windlass on each side of the reel, and connected at their lower ends to a sleeve encompassing the rope, which sleeve is provided with an adjustable friction device, which, binding with the rope as it pays out, regulates the tension or brake action of the friction-straps.

The invention also comprehends means for regulating the tension of the brake-straps, so as to stop the rope at any point of the descent, and in other details of structure, as hereinafter fully described, and pointed out in the claims.

In the drawings, A represents a suitable frame adapted to be fastened over a hook or otherwise suspended near the building at any of its upper windows. In the lower end of this frame are journaled the bearings of the windlass B, which is provided at one end with a handle, E, for turning the same. In the middle part of this windlass are placed two reel-heads, C C, between which the rope L is wound, and which rope is of a length sufficient to reach to the ground, and is provided with straps for the waist and loops for the thighs or feet, or other attachments (not shown) for supporting the individual on the rope in his descent.

D D are the friction-straps. These are two in number, and are attached at one end to the frame A, then are wrapped once or twice about the windlass, on opposite sides of the reel, and are connected at their lower ends to loops *q q*, attached to the upper end of a sleeve, G, encompassing the rope. This sleeve is slotted at P (see Fig. 2) and has a spring, M, attached to the same at its upper end, which is bent around at its lower end, so as to pass through the slot and bear against the rope inside. By a set-screw, H, this spring may be made to bear more or less against the rope to produce more or less friction. With respect to this feature I do not claim, broadly, a clamping device operated by a set-screw for retarding the passage of the rope or strap of a fire-escape, as this has been heretofore used. A rigid clamp, however, when made to bind against the rope or strap by an unyielding set-screw, is liable to strip, tear, and break the rope or suspending-strap, and is liable also to be either too loose or too tight. When such clamping device is made in the form of a spring, however, whose tension or pressure on the rope is governed by a set-screw, this difficulty is avoided in that the stripping or tearing strain on the rope is relieved and the tension of the spring makes the bite of the clamp uniform and certain.

In making use of this device the operator attaches himself to the rope L by the means described, then loosens screw H until the frictional strain of the sleeve on the straps D allows the friction of the straps on the windlass to be overcome by the weight of the person on the rope, and the latter passes out slowly from the reel as the reel and windlass revolve together inside the convolutions of the friction-straps.

It will thus be seen that the person is slowly lowered by his own gravity to the ground without any risk of an accelerated velocity, for if his speed of descent increases, the rope, in passing more rapidly through the sleeve G, increases the tension on the friction-straps, and this consequently increases their brake action on the windlass and retards its revolution.

It may be found desirable to have the descent of the person under his own control, so that he may slow himself up or entirely stop at any point in his descent, and for this purpose I attach a cord or wire, J, to the lower end of the sleeve G and wind the same upon a small reel, K, fixed loosely in a hand-hold attached to the rope and provided with a crank-handle. This reel K is attached to that part of the rope within reach of the person descending, and as he descends the cord or wire pays off the reel. Now, if he wishes to retard his descent, he simply takes hold of the handle and puts a tension on the cord J. The result is, that the tension on the brake-straps D is increased and their brake action is made to retard or entirely stop the reel and the paying out of the rope upon which the person is descending. To allow this cord J to be taken up when the rope L is wound upon the reel after a person has descended, I place a grooved pulley, O, on the windlass beside the reel-hand, and this pulley I arrange with a sliding key or bolt, k, so that it may revolve loosely on the windlass, or may be made to revolve rigidly with it. Thus when the rope L and cord J are to be wound up the pulley O is rigid on the windlass, and the end of the cord J being disconnected from sleeve G, it is attached to the periphery of the pulley O and both the cord and rope wound up together. Then when the reel K has risen to the top the pulley O is loosened from the windlass, and the cord J then wound from pulley O to reel K, after which the end of the same may be again fastened to the sleeve G.

In constructing the rope L, it is formed at its upper end with a swelled portion, s, which, when the lower end of the rope nearly reaches the ground, enters the friction-sleeve, and, by causing an increased friction, brings the rope gradually to a position of rest just about the time the ground is reached by the person descending.

After all the occupants of a building have escaped but one, the last one may reverse the ends of the rope, attaching the lower end of the rope to the hook above, and then descend, taking the machine with him.

Having thus described my invention, what I claim as new is—

1. The combination, with a suspending-frame, of a windlass journaled therein and having reel-heads, a rope adapted to be wound around the windlass, a friction-sleeve encompassing the rope, and a pair of strap-brakes connected to the frame, wrapped around the windlass, and attached to the friction-sleeve, whereby the friction of the rope passing through the sleeve is made to regulate the tension of the strap-brake around the windlass, substantially as described.

2. The combination, with the windlass B, the rope L, the strap-brakes D D, and the sleeve G, of a reel, K, fixed to and adapted to move with the rope, and a cord, J, wound around the reel and connected with the friction-sleeve, whereby the tension of the brake-straps is regulated at will, as set forth.

3. The combination, with the rope, of the friction-sleeve G, having opening P, spring M, having a bent end passing through the said opening, and a set-screw, H, as and for the purpose described.

4. The rope L, made with an increasing thickness, s, near its upper end, in combination with the friction-sleeve and a suitable clamping device, as and for the purpose described.

THOMAS WHERRITT.

Witnesses:
WILLIAM BOYLE,
LARKIN GARNETT.